July 30, 1946.   W. F. GRIMES   2,405,033
HOT RIVETER
Filed July 13, 1944   2 Sheets-Sheet 2

Inventor
WILLIAM F. GRIMES
BY
Earl Bunst
HIS Attorney

Patented July 30, 1946

2,405,033

UNITED STATES PATENT OFFICE 2,405,033

HOT RIVETER

William F. Grimes, Dayton, Ohio, assignor to The National Cash Register Company, Dayton, Ohio, a corporation of Maryland Application July 13, 1944, Serial No. 544,767

12 Claims. (Cl. 219—2)

This invention relates to an electric hot riveter wherein the electric heating current is automatically interrupted when the rivet assumes the desired degree of set.

Electric hot riveters, of the continuous pressure type, have been known heretofore that heated the rivet under pressure for a certain accurately computed period of time. In the use of such known riveters, the heating time must be computed empirically for each job set-up, because the variable factors, such as rivet size, heat conductivity of the bodies to be joined, and characteristics of the rivet metal as to the heat necessary to bring about a condition of metal flow under the available riveting force, make longer or shorter heating periods necessary. Such interval time ordinarily must be computed to a small fraction of a second. Inaccurate timing results in failure to upset the rivet or in burning the rivet.

This invention is directed to the cut-off control of the heating current applied to a rivet, by the movement of the electrode riveting tool, as the rivet is upset. As the rivet setting tool touches the tenon of the rivet, a mechanical condition is set up in a control device so that further movement of the tool, as the rivet is upset under heat and pressure, results in an interruption of the heating current. This invention, therefore, provides an electric hot riveter without an interval timer. Doing away with a control in terms of an interval of time eliminates failures due to incorrect choice of the time, and to failures due to deviation of materials from standard characteristics on which the time interval happens to be chosen.

Therefore, an object of the invention is to provide an electric hot riveter whose electric circuit is controlled by the movement of the riveter tool as the rivet assumes a set.

Another object of the invention is to provide a hot pressure riveter of the electric resistance type wherein the electric energy is cut off as the rivet is upset to the desired conformation.

Another object of the invention is to provide a control for a resistance type of electric hot riveter which is adjustable to determine how far the upset rivet end shall extend above the workpiece.

Another object of the invention is to provide a riveter having an electrode ram supplying heating current to the rivet from the commencement of the necessary force applied by the ram until the rivet is seated.

With these and incidental objects in view, the invention includes certain novel features of construction and combinations of parts, the essential elements of which are set forth in appended claims and a preferred form or embodiment of which is hereinafter described with reference to the drawings which accompanying and form a part of this specification.

The invention is disclosed as one in which the force is applied to the rivet by the operator, although it will be apparent that pneumatic, hydraulic, or other ramming means may be used together with the novel automatic control devices without departing from the scope of the invention.

General description

Figure 5:
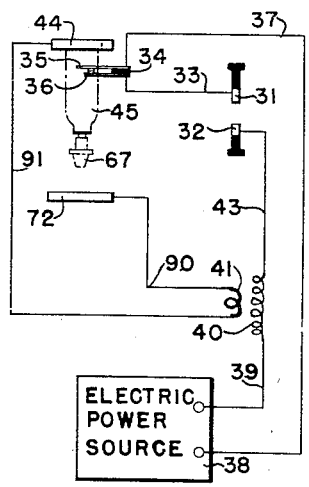
Fig. 5 is a diagram of a typical heating circuit and electric control switches with relation to the electrodes of the device.
Figure 6:
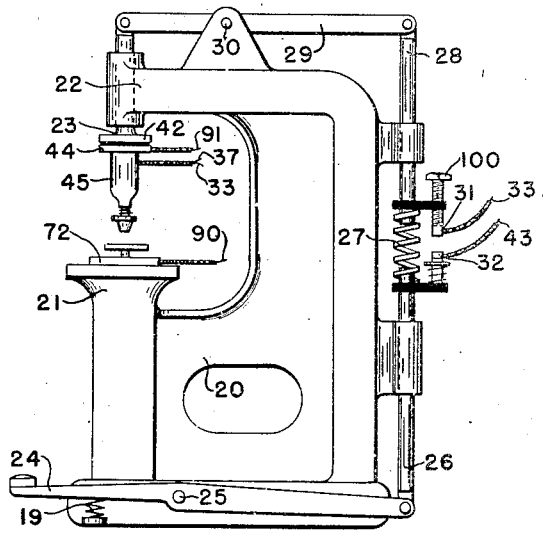
Fig. 6 shows, in side elevation, a typical hot riveter embodying the invention.

There is shown in Fig. 6 a machine frame 20 having a knee 21, and a head 22 having a ram 23 mounted therein for movement toward and away from the knee. In the embodiment of the invention shown, a pedal 24 is used to furnish force to move the ram toward the knee. Downward movement of the pedal 24, rockable counter-clockwise on stud 25 against the spring 19, causes link 26 to move upwardly against compression spring 27, which transmits the moving force to link 28, rocking lever 29 counter-clockwise on stud 30, and lowering ram 23. Compression spring 27 limits the pressure with which the ram 23 or tools carried thereby may be forced against a body interposed between it and the knee. Upon compression of spring 27, contacts 31 and 32 meet (see also Fig. 5), closing a circuit (Fig. 5) including conductor 33, switch 34 (see also Figs. 1, 2, 3, and 4) having normally closed contacts 35 and 36, conductor 37, electric power source 38, conductor 39, transformer primary coil 40, conductor 43, and contact 32. Power source 38 may be of any type suitable for creating high current values, as in the transformer secondary coil 41 and associated circuit connected through the work, as will be described. It is apparent that a battery may be used as the power source without use of a transformer device.

Insulatedly mounted on ram head 42 (Figs. 1 and 6) is a ram electrode 44 having an electrode tool holding part 45 electrically joined thereto. Tool holder 45 (Fig. 1) has a central aperture 46, into which is fastened the electrically conductive rivet setting tool 47 (Fig. 1) by means of conducting set screw 48. The tool 47 has a rivet setting work end 49 made of suitable hard conductive material.

Paralleling tool aperture 46 are apertures 50 and 51, in which are mounted rods 52 and 53, joined at their upper ends by insulator cross piece 54 in a cavity 55 and fastened at their lower ends to cylinder 56, through which the projecting end of tool 47 freely passes. Parts 52, 53, and 56 are insulated from the tool holder 45 by insulators such as insulators 59, 60, 61, and 62, which act also as bushings in which the parts can slidably move. The structure comprising parts 52, 53, 54, and 56 moves as a unit within the limits imposed by the distance between surface 65 and surface 66. Cylinder 56 has a cone-shaped feeler 67 screwed onto its lower end. Feeler 67 surrounds but does not touch the lower end of tool 47 and projects beyond it a slight distance. Between insulator 61 and surface 70 of feeler 67 is a compression spring 71 keeping the feeler 67 resiliently in the position shown in Fig. 1, the lip 76 of the feeler extending beyond the tool head 49.

Figure 1:
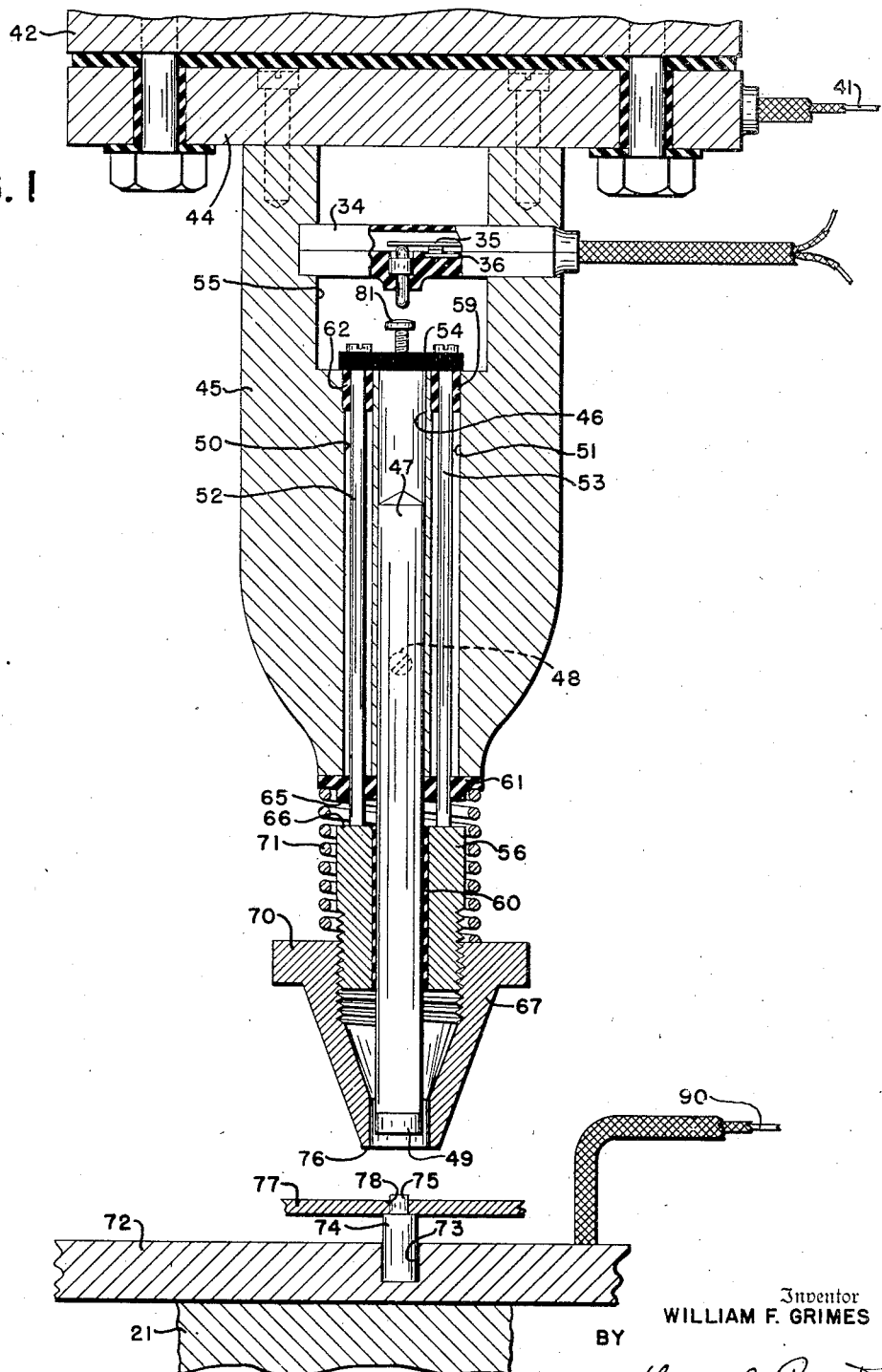
Fig. 1 shows the ram electrode in operative relation to the work and the work support electrode, together with the novel control means.

On knee 21 is placed a bolster electrode, like electrode 72, formed to hold by the head the type of rivet to undergo treatment. Fig. 1 shows the rivet as having a stud head 74 held in a hole 73 with the tenon 75 in the line of movement of the work end 49 of the rivet setting tool 47.

Figure 2:
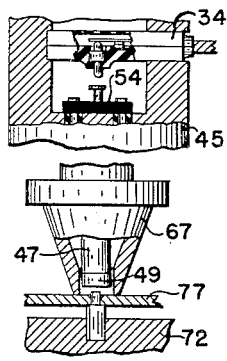
Fig. 2 shows, in a broken-away view, the initial contact of the control element with the work to be riveted.
Figure 3:
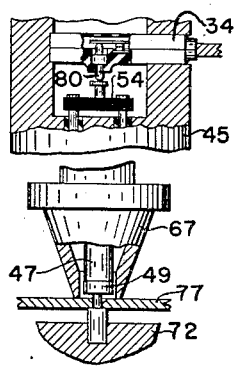
Fig. 3 shows, in a broken-away view, the initial contact of the riveter tool electrode with the rivet.
Figure 4:
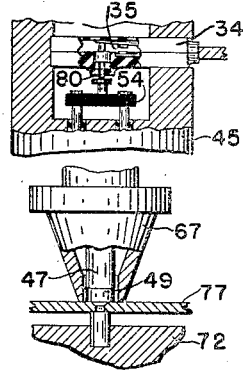
Fig. 4 shows the rivet upset and the control means in the operated condition.

As the ram descends, the lip 76 of the feeler 67 comes into contact with the upper surface of the work piece 77, in which the stud to be riveted is inserted through the hole 78 made for that purpose (see Fig. 2). On continued downward movement of the ram, the feeler 67 is held stationary by the work piece, and the work end 49 of the rivet setting tool contacts the end of the tenon of the rivet (see Fig. 3). Cross piece 54 is moved upwardly slightly, as shown in Fig. 3, by reason of the upward movement of the parts 67, 56, 52, and 53 relative to the tool 47. At this point, the then cold rivet temporarily halts movement of the ram 23 (Fig. 6), and spring 27 compresses until contacts 31 and 32 close. The rivet tenon 75 (Fig. 1) is heated by the ensuing current passing through it from one electrode to the other and reaches a plastic state where the downward force of the ram causes the rivet to upset, as shown in Fig. 4, allowing the setting tool 47 to move downwardly further relatively to lips 76, increasing the movement of cross piece 54 toward switch 34 until it pushes switch actuating pin 80 and raises contact 35, breaking the primary coil supply circuit (see Fig. 5). Compression spring 27 is selected of a strength necessary to transmit force sufficient to upset a rivet heated to a plastic state.

The secondary coil 41 (Fig. 5) is connected to support electrode 72 (see also Fig. 1) by conductor 90 and is connected to ram electrode 44 by conductor 91, and the current is completed as the work end 49 (Fig. 1) of the setting tool touches the rivet tenon, but is not energized until contacts 31 and 32 (Figs. 5 and 6) meet in the primary circuit after the pressure applied through spring 27 approaches the limit. Adjustment screw 100 (Fig. 6) is used to determine the pressure point at which the current is applied.

Screw 81 (Fig. 1) on cross piece 54 may be adjusted to open switch 34 at the degree of set desired for the rivet tenon. Feeler 67 may be adjusted by the screw threads to accomplish the same purpose Switch 34 is preferably of the type having a snap action on very small movement, so as to achieve more exact control. It is to be noted that switch 34 may be used in other places than in the primary coil circuit to operate auxiliary switching devices or electronic relays to interrupt the current source, thus permitting the use of very heavy currents. Switch 34 might also be placed directly in the secondary coil circuit without departure from the principles of the invention.

Figure 7:
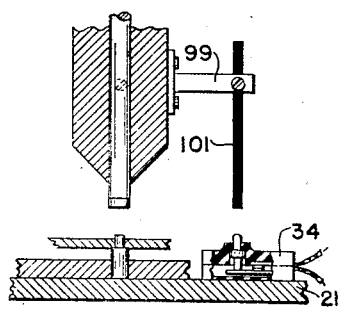
Figs. 7 and 8 show modified forms of the invention wherein the control elements do not contact the workpiece.
Figure 8:
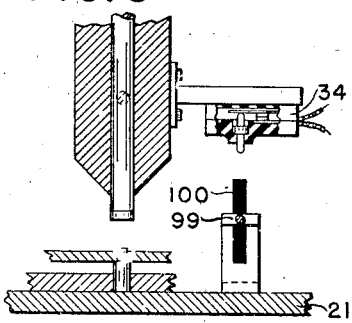

Figs. 7 and 8 show modified forms of the invention wherein the switch 34 is actuated by a fixed feeler 101 adjustable by screw 99 according to a job set-up Fig. 7 shows the switch 34 on the knee 21 and the feeler 101 on the tool holder 45, and Fig. 8 shows the switch 34 on the ram tool holder 45 and the feeler on the knee 21. It is to be observed that, while in these modified forms of the invention a new adjustment of the feeler 100 might have to be made for each height of work, there is no time control needed, as the electric interruption is caused by the rivet's being upset.

This novel hot riveter operates perfectly over a wide range of current values and therefore can accept work of widely varying current requirements without adjustment of the electric power source.

The invention is not restricted to the resistance type of heating, although it is the preferred type, as the heating may be accomplished by other means such as by use of an induction coil surrounding the work. It is to be noted that the invention is not dependent on the mode of electric heating.

While the form of the invention shown and described herein is admirably adapted to fulfill the objects primarily stated, it is to be understood that it is not intended to confine the invention to the forms or embodiments disclosed herein, for it is susceptible of embodiment in various forms all coming within the scope of the claims which follow.

What is claimed is:

1. In an electric hot riveter device for riveting a plurality of parts together, the combination of two opposed electrode pressing members; means to move the electrodes toward each other, said moving means including a force-limiting means; an electric circuit to heat the rivet; an energizing circuit for the first-mentioned circuit made complete as the pressing members contact a rivet and the pressure reaches the limit, said energizing circuit including a control means mounted on one of said pressing members and actuable to break the circuit; and a sensing member movable into contact with one of said parts to actuate the control means to break the circuit as the rivet is upset by the heat of the current and pressure.

2. In combination, a source of electric energy; a press having two jaws each of which is an electrode; means to move the jaws toward one another to hold a metal rivet and press it; normally incomplete electric means for coupling the energy source to the electrodes to pass a current from one electrode to the other through the rivet, said means including a pressure switch making the electric means complete as the pressure on the rivet reaches a definite value below the cold flow pressure point of the rivet, and said electric means containing a normally closed control switch mounted on one of said jaws and movable therewith; and means mounted on the said one of the jaws for movement therewith and relative thereto, which when moved relatively to the said one jaw opens the control switch, said means being actuated relatively to said one jaw by movement of an electrode in following the rivet as it is upset after it is heated by current to the flow point.

3. In a machine for upsetting a rivet in a workpiece, the combination of a source of electric energy; a press having two jaws each of which is an electrode; means to move the jaws toward one another to hold a metal rivet and press it; circuit means for coupling the energy source to the electrodes to pass a current from one electrode to the other through the rivet, said circuit means including a pressure switch making the circuit complete as the pressure on the rivet reaches a definite value below the cold flow pressure point of the rivet, and said circuit means containing a normally closed control switch mounted on one of said jaws and movable therewith; and movable means mounted on said one jaw and movable relatively thereto and which when moved relatively to said one jaw opens the control switch, said movable means being moved relatively to the said one jaw by movement of an electrode in following the rivet as it is upset after it is heated by current to the flow point, said moving means including a feeler gauge movable into contact with the workpiece and adjustable to determine the extent of the upset.

4. In an electric hot riveter, the combination of an electric rivet heating means; a power circuit for the heating means including a normally closed switch operable to interrupt the power through the heating means; a supporting electrode for a rivet; a ram electrode movable against a supported rivet; means to move the ram electrode to press against the supported rivet; and a movable member carried by the ram electrode which when moved a predetermined distance opens the switch to interrupt the circuit through the heating means as the ram electrode moves said predetermined distance to upset the rivet.

5. In a device for hot riveting a metal member to a perforated workpiece by upsetting a tenon on the rivet, the combination of an electrode for supporting the member with the tenon protruded through the perforation in the workpiece; a ram electrode supported so that it may be moved toward the protruding tenon in opposed relation to the supporting electrode; means to move the ram with a force less than required to upset the rivet when cold but more than required to upset the rivet when heated substantially to hot forging temperature; an electric circuit including the ram electrode, the rivet, and the support electrode in series; an energizing source of electric power; means which includes a normally closed control switch, and a normally open switch which is closed as the ram is moved against the tenon with maximum force, coupling said source of power to the electric circuit, which circuit is thereby energized to heat the tenon to upsetting temperature; actuating means carried by the ram which, when moved, opens the control switch at a predetermined point in the upsetting of the tenon; and a means mounted on the ram controlling the amount of upset the rivet is given, said last-named means including a feeler which moves the actuating means to open the control switch as the ram electrode comes within a certain distance of the workpiece.

6. In a device for hot riveting a metal member to a perforated workpiece by upsetting a tenon on the rivet, the combination of an electrode for supporting the member with the tenon protruded through the perforation in the workpiece; a ram electrode supported so that it may be moved toward the protruding tenon in opposed relation to the supporting electrode; means to move the ram with a force less than required to upset the rivet when cold but more than required to upset the rivet when heated substantially to hot forging temperature; an electric circuit including the ram electrode, the rivet, and the support electrode in series; an energizing source of electric power; means which includes a normally closed control switch, and a normally open switch which is closed as the ram is moved against the tenon with maximum force, coupling said source of power to the electric circuit, which circuit is thereby energized to heat the tenon to upsetting temperature; actuating means carried by the ram which, when moved, opens the control switch at a predetermined point in the upsetting of the tenon; and a means mounted on the ram and including a feeler which moves to open the control switch as the ram electrode comes within a certain distance of the workpiece, said feeler being adjustable on the ram to control the amount of the upset.

7. In a device for electrically treating a body, the combination of a stationary electrode; an opposed electrode movable toward the stationary electrode; means to move the opposed electrode toward the stationary electrode; a feeler member carried by the opposed electrode, said member having a normal position on said electrode leading the same in a direction toward the stationary electrode but movable backwardly relatively thereto; and a source of electric potential supplied to the electrodes through circuits including a switch, said switch being caused to open and cut off the electric potential by the relative movement of the feeler member on the opposed electrode when the movement exceeds a certain selected amount from normal position as the member contacts any body held between the electrodes.

8. In a device for electrically treating a body, the combination of a stationary electrode; an opposed electrode movable toward the stationary electrode; means to move the opposed electrode toward the stationary electrode; a feeler member carried by the opposed electrode, said feeler member having a normal position on said electrode leading the same in a direction toward the stationary electrode but movable backwardly relatively thereto if a body is contacted as the electrodes move toward one another; and a source of electric potential supplied to the electrodes through circuits including a switch, said switch being caused to operate and cut off the electric potential when the relative movement of the feeler member on the opposed electrode exceeds a certain selected amount from normal position.

9. In an electric hot riveter, the combination of a pressing electrode; means to supply the pressing electrode with electric potential; an electrically insulated sleeve surrounding the electrode which normally sheaths the work end of the electrode but which is resiliently movable backwardly to present the electrode to working position; and an electric switch in circuit with the electrode operated as the backward movement of the sleeve reaches a certain amount.

10. In an electric hot riveter, the combination of an electrode presser member; a member movably supported on and protruding beyond the working end of the electrode, the direction of possible movement of said member being in a retracting direction to allow the working end of the electrode to present the electrode to working position; a switch in circuit with the electrode; and adjustable means interposed between the movable member and the switch to cause the switch to operate after a retraction of the movable member a selected distance.

11. In an electric hot riveter, a ram; a rivet-pressing electrode carried by the ram; a feeler member movably and adjustably mounted on the ram so that, as the electrode presses and upsets a rivet, the feeler member moves; and a switch in circuit with the electrode actuated by the movement of the feeler member when the electrode and the feeler member are in a certain position relative to one another, depending on the adjustment of the feeler member.

12. In an electric hot riveter, the combination of a ram for supplying moving force to press a rivet; a sheathed electrode carried by the ram, said sheath being retractable, permitting the electrode to contact a rivet, said electrode being adapted to press the end of a rivet to be formed and the sheet being adapted to contact a workpiece through which the said end of the rivet protrudes, thereby to cause relative motion between the electrode and the sheath as the rivet upsets; and an electric switch in circuit with the electrode which is operated by the sheath as the rivet is upset.

WILLIAM F. GRIMES.

Certificate of Correction

Patent No. 2,405,033.                                            July 30, 1946.

WILLIAM F. GRIMES

It is hereby certified that errors appear in the printed specification of the above numbered patent requiring correction as follows: Column 5, line 74, claim 5, after "opens" insert a comma; column 8, line 13, claim 12, for "sheet" read *sheath*; and that the said Letters Patent should be read with these corrections therein that the same may conform to the record of the case in the Patent Office.

Signed and sealed this 5th day of November, A. D. 1946.

[SEAL]

LESLIE FRAZER,
*First Assistant Commissioner of Patents.*